(12) United States Patent
Brunner

(10) Patent No.: US 9,289,939 B2
(45) Date of Patent: Mar. 22, 2016

(54) APPARATUS AND METHOD OF SHAPING PLASTICS MATERIAL PRE-FORMS WITH SEPARATE FLOW PATHS FOR BLOWING AIR AND CONTROL AIR

(71) Applicant: KRONES AG, Neutraubling (DE)

(72) Inventor: Andreas Brunner, Aufhausen (DE)

(73) Assignee: KRONES AG (DE)

( * ) Notice: Subject to any disclaimer, the term of this patent is extended or adjusted under 35 U.S.C. 154(b) by 258 days.

(21) Appl. No.: 13/954,505

(22) Filed: Jul. 30, 2013

(65) Prior Publication Data

US 2014/0091499 A1 Apr. 3, 2014

(30) Foreign Application Priority Data

Jul. 30, 2012 (DE) .......................... 10 2012 106 916

(51) Int. Cl.
*B29C 49/36* (2006.01)
*B29C 49/46* (2006.01)

(52) U.S. Cl.
CPC ................. *B29C 49/46* (2013.01); *B29C 49/36* (2013.01); *B29C 2049/4635* (2013.01); *B29C 2049/4697* (2013.01)

(58) Field of Classification Search
CPC B29C 49/46; B29C 49/36; B29C 2049/4697; B29C 2049/4635
See application file for complete search history.

(56) References Cited

U.S. PATENT DOCUMENTS

| 4,790,741 | A | * | 12/1988 | Takakusaki | ......... B29C 49/4205 264/905 |
| 5,648,026 | A | * | 7/1997 | Weiss | ....................... B29C 49/42 264/37.16 |
| 7,803,311 | B2 | * | 9/2010 | Finger | ................... B29C 49/783 264/525 |
| 7,892,477 | B2 | | 2/2011 | Hirdina | .......................... 264/529 |
| 2011/0286899 | A1 | | 11/2011 | Martini et al. | ................. 426/210 |

(Continued)

FOREIGN PATENT DOCUMENTS

| DE | 202004021781 | 1/2011 | ............. B29C 49/42 |
| DE | 102010022132 | 11/2011 | ................ A61L 2/20 |

(Continued)

OTHER PUBLICATIONS

German search report issued in corresponding German Patent Application Serial No. 10 2012 106 916.6 dated Jun. 12, 2013 (5 pgs).

*Primary Examiner* — Robert B Davis
(74) *Attorney, Agent, or Firm* — Hayes Soloway P.C.

(57) ABSTRACT

An apparatus for shaping plastics material pre-forms into plastics material containers has a movable carrier on which are arranged a plurality of shaping stations for shaping the plastics material pre-forms into the plastics material containers. Each shaping station has a stressing device which acts upon the plastics material pre-forms for the expansion thereof with a gaseous medium, and a pressure preparation device which prepares the gaseous medium. The pressure preparation device is arranged in a stationary manner and supplies the shaping stations with the gaseous medium for the expansion of the plastics material pre-forms by way of at least one connection line. A distribution device is provided which distributes the gaseous medium from the pressure preparation device shaping stations. A control air line supplies the valve device with a control gas, and a blowing air line supplies the shaping stations with the gaseous medium, are separate from each other at least downstream of the distribution device in a flow direction of the gaseous medium.

12 Claims, 2 Drawing Sheets

(56) References Cited

U.S. PATENT DOCUMENTS

| | | | |
|---|---|---|---|
| 2011/0309557 A1 | 12/2011 | Martini et al. | 264/523 |
| 2012/0223465 A1 | 9/2012 | Voth et al. | 264/523 |

FOREIGN PATENT DOCUMENTS

| | | | |
|---|---|---|---|
| DE | 102011013124 | 9/2012 | A61L 2/20 |
| EP | 2 388 128 | 5/2011 | B29C 49/42 |

* cited by examiner

APPARATUS AND METHOD OF SHAPING PLASTICS MATERIAL PRE-FORMS WITH SEPARATE FLOW PATHS FOR BLOWING AIR AND CONTROL AIR

BACKGROUND OF THE INVENTION

The present invention relates to an apparatus for shaping plastics material pre-forms into plastics material containers. Machines of this type have long been known from the prior art, or example in the form of stretch blow moulding machines. These machines usually have a rotatable carrier on which a plurality of shaping stations are arranged. In the individual shaping stations the heated plastics material pre-forms are stretched by means of a stretch bar driven in a linear manner and expanded in blow moulds by a gaseous medium and, in particular, compressed air. Specific products such as fruit juice beverages or milk beverages require as aseptic a filling as possible in order to achieve the necessary minimum shelf life. One possibility of implementing this is the sterile production of the plastics material containers used for the filling. In this case it is necessary to supply the blow moulding stations with sterile compressed air. This sterile compressed air acts in this case as a shaping medium for the plastics material containers.

An apparatus and a method of cleaning gas in blow moulding machines is known from EP 2 388 128 12. In this case at least one gas line, which can be a gas supply line or a gas removal line to or from a blow moulding station, has arranged in it at least one gas preparation device which is capable of filtering gas in a sterile manner and/or of reducing a quantity of an oxidative disinfection or sterilization agent contained in the gas flowing through and/or flowing past.

It is customary in the prior art for compressed air from a compressed air source to be conveyed out of the stationary portion of the machine by way of a distributor device (such as for example a rotary distributor) into the rotating portion of the machine, i.e. a turntable. In this rotating portion of the machine the compressed air is usually supplied from the distribution device to pressure reduction units. These pressure reduction units prepare the compressed air for different pressure levels required for the shaping process. In this case the pressure reduction units are designed for example in the form of compact sub-assemblies with dome-loaded pressure regulators and attachment apparatuses for the compressed air inlet and the compressed air outlet.

Within the scope of the invention it is possible in this case for these pressure reduction units to be arranged in the form of a star around the distribution device in the peripheral direction and optionally also to be directly attached to the distribution device by way of a flange connection. Further, it is also possible for the compressed air to be supplied at different pressure levels from reduction units to various annular ducts by way of hose lines. These annular ducts distribute the compressed air to the blow moulding stations.

In addition, as well as the supply of the individual shaping stations with compressed air as the shaping medium of the plastics material containers in the rotating portion of the machine, it is also customary for control air to be produced at different pressure levels and with different tasks. This control air is required for example in order to switch valves in the blow moulding station. In this case the control air is usually branched off from the blowing air line in the rotating portion of the machine and is reduced to the necessary pressure levels by reduction devices.

A drawback of this design is that it is frequently difficult in this case to ensure a sterile supply of blowing air. In particular, in the blowing air line the seals of the components tone another and the connections of the hose lines for the attachments thereof are a potential source of contamination of the blowing air. The seals are designed in the form of conventional O-ring and quad-ring seals. In the gaps between these rubber seals and the associated groove it is possible for micro-organisms to multiply and contaminate the blowing air.

The use, in particular, of very hot sterilization agents is again problematic for the valves present in the control air line.

The object of the present invention is therefore to improve the supply with sterile blowing air in blow moulding machines of this type.

SUMMARY OF THE INVENTION

An apparatus according to the invention for the shaping of plastics material pre-forms into plastics material containers has a movable carrier on which are arranged a plurality of shaping stations for shaping the plastics material pre-forms into the plastics material containers. Each shaping station has in this case a stressing device which acts upon the plastics material pre-forms for the expansion thereof with a gaseous medium. In addition, a pressure preparation device is provided which prepares the gaseous medium, this pressure preparation device being arranged in a stationary manner and supplying the shaping station with the gaseous medium (in particular for the expansion of the plastics material pre-forms) by way of at least one connection line. In addition, a distribution device is provided which distributes the gaseous medium from the pressure preparation device arranged in a stationary manner to the shaping stations arranged in a movable manner, each shaping station having at least one pneumatically actuated valve device and this valve device likewise being in fluid communication with the pressure preparation device and being supplied by the latter.

In addition, the apparatus has a clean room, inside which the shaping stations are arranged at least locally, this clean room being bounded off from an environment by means of at least one wall.

According to the invention a control air line, which supplies the valve device with a control gas, and a blowing air line, which supplies the shaping stations with the gaseous medium, are separate from each other (in particular completely) at least downstream of the distribution device in a flow direction of the gaseous medium.

In this case the control air is understood, in particular, as being that air which is used to actuate, and in particular to switch the valves. In addition, however, this control air can also be used to carry out other processes, such as for example the movement of a stretch bar or the movement of blow mould parts or even the stressing of an air cushion which presses the blow mould parts against each other.

It is therefore proposed within the scope of the invention that the control air and the blowing air should be conveyed separately from each other in all events after the distribution device. This design affords the advantage that the media in the blowing air line and in the control air line can have different degrees of purity. Whereas the blowing air should be sterile, this does not necessarily need to be the case for the control air, which actuates the valves. It is advantageous for those elements which are actuated, by the control air also to be arranged outside the clean room, so that in this way too no contaminated or non-sterile air can penetrate into the clean room.

A clear division is therefore proposed between the blowing air line and the control air line in the movable, and in particular rotating portion of the machine. The blowing air and the control air are conveyed through two separate lines out of the stationary portion of the machine through the distribution device into the rotating portion of the machine.

It is advantageous for the shaping stations to be arranged completely in the aforesaid clean room. In this case it is particularly preferred for this clean room to be arranged in an annular or respectively toroidal manner around a movement path of the shaping stations. The movable carrier is preferably a rotatable carrier or a blow moulding wheel respectively on which a plurality of shaping stations are arranged. In addition, it is preferably possible for a region of the aforesaid distribution device, in particular the stationary region, to be arranged in a non-sterile region.

In the case of a further advantageous embodiment a first supply line is provided which supplies the control gas (also referred to below as control air) to the distribution device, and a second supply line which supplies the blowing air to the distribution device. In this case these supply lines are separate from each other at least locally upstream of the distribution device in a flow direction of the gaseous medium. This design is advantageous in particular when a sterilization of the lines is provided. In this way, it is possible in fact for a hot sterilization agent to be supplied directly to the blowing air line, but not to the control air line, in which heat-sensitive elements are arranged.

It is therefore preferred for the control air and the blowing air already to be conveyed separately by way of the distribution device.

In the case of a further advantageous embodiment a cleaning device for cleaning one blowing air is provided in at least one connecting line by way of which blowing air is supplied to the shaping stations. In this way, it is proposed that cleaning devices, for example filters and in particular HEPA filters, should be integrated in the blowing air line, in order to permit the supply with sterile blowing air. It is preferable for these filter devices to be inserted into the rotating portion of the machine and, in particular, into reduction units.

In this way, it is preferable for the apparatus to have at least one pressure reduction device which is located between the pressure preparation device and the shaping stations. It is advantageous for this pressure reduction device or reducing device to be arranged in the movable part of the machine, i.e. downstream of the distribution device. In this way, it is preferable, however, for this pressure reduction device to be connected in terms of flow by way of the distribution device to the pressure preparation device and, on the other hand, also to the shaping stations. During the blow moulding procedure it is customary for a multiplicity of pressure levels to be made available for the expansion of the containers, such as for example a preliminary blow moulding pressure and a finishing blow moulding pressure. These pressure reduction devices reduce the pressure made available by the pressure preparation device to the desired pressure levels.

It is advantageous in this case for this pressure reduction device to be designed in the form of a modular sub-assembly. In this case it is possible for the actual pressure reduction device and one or more filtering devices to be arranged in series in this modular sub-assembly. It is advantageous in this case for these components of the pressure reduction unit to be sealed off by aseptic seals, and in particular gap-free aseptic O-ring seals.

It is thus advantageous for the pressure reduction device to be arranged between the distribution device and the shaping stations.

In this way, the blowing air line can be divided into two portions, namely a non-sterile region from the pressure preparation device or compressed air source as far as the filtering devices and a sterile region starting at the filtering devices as far as the pressure stressing device of the plastics material containers in the shaping station. This compressed air stressing device of the plastics material containers is, in particular, a blowing nozzle which is applied to the aperture of the containers for the expansion thereof. The positioning of these filtering devices in the blowing air line is preferably selected with the pressure reduction devices in such a way that as small a portion of the blowing air line as possible is designed in the form of a sterile region. The risk of contamination of the sterile region is minimized by a small number of components with associated seals in this blowing air line.

In the case of a further advantageous embodiment the pressure reduction device is arranged between the distribution device and the cleaning device. This means that the pressure made available is first reduced and the cleaning procedure is carried out only subsequently.

In the case of a further advantageous embodiment the apparatus has at least one collecting line which is connected in terms of flow at least for a time to the individual shaping stations or respectively to a plurality of shaping stations. In particular, this collecting line is an annular line from which a plurality of supply lines branch off to the individual shaping stations. It is preferable for this annular line to supply, in particular, all the shaping stations.

In the case of a further advantageous embodiment the apparatus has a supply line for a sterilization medium, this supply line being capable of being connected in terms of flow to the blowing air line. In this case, the provision is made, as mentioned above, that this supply line or the sterilization agent cannot pass into the control air line, but only into the blowing air line. It is preferable for this supply line for the sterilization medium to open into the supply line for the blowing air, i.e. in particular upstream of the distribution device. In this way, the flow paths for the blowing air can also be sterilized or cleaned respectively upstream of the distribution device.

In other words the blowing air line can be sterilized in the movable or respectively rotating portion of the machine by a gaseous sterilization medium. The gaseous sterilization medium, preferably a gaseous $H_2O_2$/air mixture, is fed in a non-productive sterilization process through a separate line into the distribution device. The gaseous sterilization medium sterilizes the blowing air line from the distribution device as far as the pressure stressing device of the plastics material containers in the shaping station. In this case, in particular, the HEPA filters are rinsed through and micro-organisms possibly deposited in the filters are destroyed by the sterilization medium.

As mentioned above, the control air line is preferably designed in the form of a non-sterile region continuously from the compressed air source as far as the consumer devices. This means that preferably neither HEPA filters nor aseptic seals are used in the control air line. It is possible to dispense with these measures in the control air line since the control air cannot come into contact with the plastics material containers.

The above-mentioned filtering of the blowing air by the HEPA filters allows the shaping stations to be supplied with a sterile shaping medium. Contamination of the shaped plastics material containers by a polluted shaping medium is minimized as a result. It is advantageous for the filter devices to be designed in such a way that they have a resistance to a sterilization agent, such as in particular hydrogen peroxide ($H_2O_2$). It is advantageous for these filter devices also to have a temperature resistance of up to 100°, preferably up to 120° and in a particularly preferred manner up to 140°. Sterilization of these filter devices or respectively even of the blowing air line is thus preferably carried out by a gaseous $H_2O_2$/air mixture and, in particular, in a non-productive sterilization process.

On account of the above-mentioned positioning of the filter devices in a rotating portion of the machine downstream of the apparatus for the pressure reduction, i.e. the pressure reduction devices, (which can be in particular dome-loaded pressure regulators) the sterile portion of the blowing air line is kept as small as possible. The risk of contamination of the sterile region is minimized by a small number of components with associated seals in the blow moulding line. Integration of the filter devices together with the pressure reduction devices or dome-loaded pressure regulators respectively into a compact sub-assembly has the additional advantage that connection components and additional seals between the pressure reduction device and the filter devices can be minimized.

The separation of the blowing air line from the control air line in the rotating portion of the machine has the advantage that the control air line need not be made sterile. It is thus possible, as mentioned above, to dispense with expensive filtering devices and also aseptic O-ring seals in this control air line.

The present invention further relates to a method of shaping plastics material pre-forms into plastics material containers, in which the plastics material pre-forms are conveyed along a pre-set conveying path by means of a conveying device and are shaped into the plastics material containers by being acted upon with compressed air by a plurality of shaping stations during this conveying. In this case the plastics material pre-forms are conveyed inside a clean room during this shaping and blowing air for shaping the plastics material pre-forms is prepared by a pressure preparation device arranged in a stationary sooner and is made available to the shaping stations by way of connection lines and a distribution device and at least one valve device of the apparatus is actuated in a pneumatic manner.

According to the invention, control air for actuating the valve device and the blowing air for shaping the plastics material pre-forms are separate from each other at least downstream of the distribution device. It is thus advantageous for the control air and the blowing air to have different degrees of purity, in which case sterile air, in particular, is used as the blowing air. It is advantageous for the blowing air to be reduced to a multiplicity of different pressure stages. In the case of a further advantageous method a reduction in the pressure of the blowing air is carried out at at least two different pressure levels and it is advantageous for this reduction in the pressure to be carried out only downstream of the distribution device. It is advantageous for cleaning of the blowing air to be carried out, it being particularly preferable for this cleaning to take place only after the reduction in the pressure.

BRIEF DESCRIPTION OF THE DRAWINGS

Further advantages and embodiments are evident from the accompanying drawings. In the drawings

DETAILED DESCRIPTION OF THE INVENTION

Figure 1:
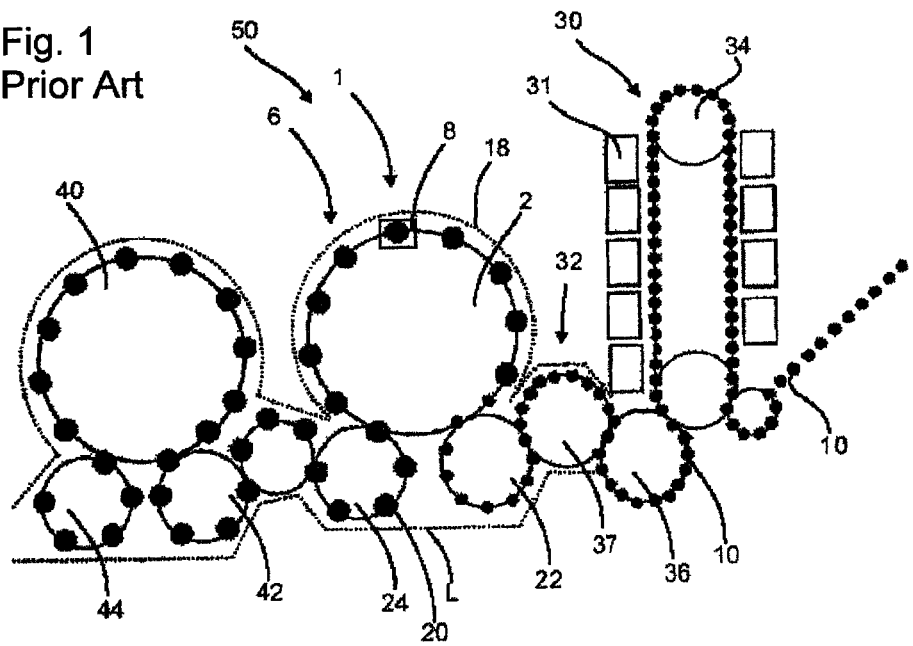
FIG. 1 is a diagrammatic illustration of a plant for the shaping of plastics material pre-forms into plastics material containers.

FIG. 1 is a diagrammatic illustration of a plant for the production of plastics material containers according to the prior art. This plant 50 has a heating device 30 in which plastics material pre-forms 10 are heated. In this case these plastics material pre-forms 10 are conveyed through this heating device 30 by means of a conveying device 34, such as a continuous chain in this case, and are heated by a plurality of heating elements 31 during this. This heating device 30 has attached to it a transfer unit 36 which transfers the pre-forms 10 to a sterilization device 32. This sterilization device 32 likewise has in this case a conveying wheel 37 and sterilization elements can be arranged on this conveying wheel 37 or in a stationary manner. Sterilization by hydrogen peroxide gas or even by electromagnetic radiation is possible for example in this region. In particular, an internal sterilization of the pre-forms is carried out in this region.

The reference numeral 6 designates a clean room as a whole, the external boundaries of which are indicated in this case by the dotted line L. In a further preferred design the clean room 6 is situated not only in the region of the conveying wheel 2 and the filling device 40, but possibly begins already in the region of the heating device 30, the sterilization device 32, the supply of the plastics material pre-forms and/or the production of the plastics material pre-forms. It is evident that this clean room 6 starts in this case in the region of the sterilization unit 32. Separating devices can be provided in this region in order to introduce the plastics material pre-forms into the clean room 6 without an excessive amount of gas flowing inside the clean room in this case and thus being lost.

As indicated by the broken line L, the clean room is adapted to the external shape of the individual components of the plant. In this way, the volume of the clean room can be reduced. The clean room can also be designed at least locally in the manner of a channel around the conveying path of the containers.

The reference number 1 designates a shaping apparatus as a whole, in which a plurality of blow moulding stations or shaping stations 8 are respectively arranged on a conveying wheel 2, only one of these blow moulding stations 8 being shown in this case. The plastics material pre-forms 10 are expanded by means of these blow moulding stations 8 to form containers 20. Although it is not shown in detail here the entire region of the conveying device 2 is not situated inside the clean room 6, but the clean room 6 or insulator respectively is implemented as a mini-insulator as it were inside the apparatus as a whole. In this way, it would be possible tor the clean room to be designed in the manner of a channel at least in the region of the shaping apparatus 1.

The reference number 22 refers to a supply device which transfers the pre-forms to the shaping device 1 and the reference number 24 to a removal device which removes the plastics material containers 20 produced from the shaping apparatus 1. It is evident that the clean room 6 in the region of the supply device 22 and of the removal device 24 has recesses in each case which receive the aforesaid devices 22, 24. In this way, a transfer of the plastics material pre-forms 10 to the shaping apparatus 1 or respectively a taking-on of the plastics material containers 20 from the shaping apparatus 1 can be achieved in a particularly advantageous manner.

The expanded plastics material containers are transferred by a transfer unit 42 to a filling device 40 and are then removed from this filling device 40 by way of a further conveying unit 44. In this case the filling device 40 is also situated inside the aforesaid clean room 6. In addition, in the case of the filling device it would be possible for the clean room 6 to have arranged completely inside it, not the entire filling device 40 with for example a reservoir for a beverage, but also only those areas in which the containers are actually conveyed. In this respect, the filling device could also be designed in a manner similar to the apparatus 1 for the shaping or plastics material pre-forms 10.

As mentioned, the clean room 6 is reduced in the region of the apparatus 1 to the smallest possible area, namely essentially to the blow moulding stations 8 themselves. On account of this compact design of the clean room 6 it is possible in an easier and more rapid manner for a clean room to be produced altogether and, in addition, keeping it sterile in the operating phase is less complicated. In addition, less sterile air is required, and this leads to smaller filter plants and the risk of controlled swirl formation is also reduced.

Figure 2:
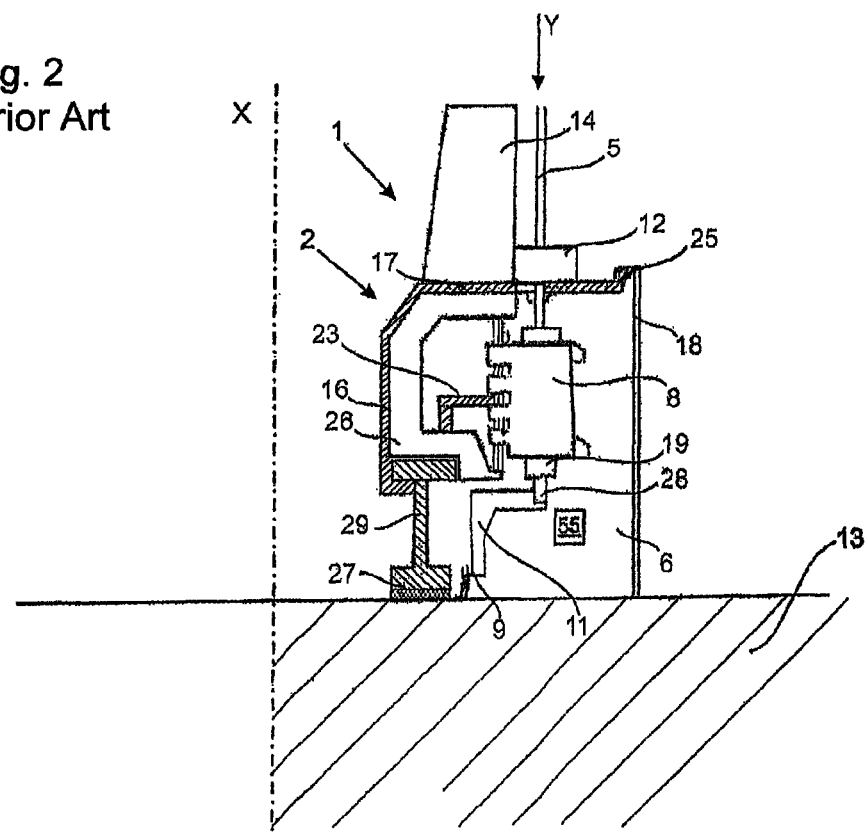
FIG. 2 is a sectional illustration of an apparatus for the shaping of plastics material pre-forms into plastics material containers.

FIG. 2 is a detailed illustration of the apparatus 1 according to the prior art in the region of a blow moulding station 8. A plurality of blow moulding stations 8 of this type are moved so as to rotate about an axis X by a conveying device 2 or a carrier respectively. As is evident from FIG. 2, the blow moulding station 8 is conveyed inside the clean room 6 which is designed in this case in the manner of a channel. This clean room 6 is closed off by a movable side wall 16 and a cover 17 formed in one piece with the aforesaid side wall 6. The aforesaid side wall 6 and the cover 17 rotate jointly with the blow moulding station 8 in this case.

The reference number 18 refers to a further wall which bounds the clean room 6. The wall 18 is in this case a wall which is situated on the outside and which is arranged so as to be stationary. A sealing device 25, which seals off from each other—for example with the use of a surge tank—the elements 17 and 18 movable with respect to each other, is provided between the cover 17 and the wall 18. The lower region of the wall 18 is arranged in a fixed and sealed manner on a base 13. A carrier 26 is provided inside the clean room 6 in a manner resting directly against the wall 16 in this case, and it likewise moves in a rotating manner and in turn has provided on it a holding device 23 which holds the blow moulding station 8.

The reference number 11 refers to a follower device which can be actuated by a guide cam 9 in order to open and close the blow moulding station on its path through the clean room 6, in particular in order to insert the plastics material pre-form into the blow moulding station and also to remove it again. In this case a guide cam 9 is also arranged inside the clean room 6. It would also be possible, however, for example for a portion 11 below the individual blow moulding stations 8 already to be brought out of the clean room 6.

The conveying device 2 can have still further elements which are situated above the clean room 6.

The carrier 26 is arranged in this case in a fixed manner on a holding member 29 and this holding member is in turn movable with respect to the base 13. In this case the reference number 27 refers to a further sealing device which in this region too forms a seal of the areas 13 and 29 movable with respect to each other.

The reference number 5 refers to a stretch bar which is movable with respect to the blow moulding station in order to stretch the plastics material pre-forms 10 in the longitudinal direction thereof. In this case a slide 12, with respect to which the stretch bar is movable in the direction Y, is arranged on the cover 17. The reference number 14 refers to a further holding means for this slide 12 of the stretch bar 5.

It is evident that certain areas of the stretch bar are both outside the clean room 6 and inside the clean room 6 during the blow moulding procedure. For this purpose it is possible for a protection device such as a folding bellows which surrounds the stretch bar 5 to be provided outside the clean room 6 and above the slide 12 respectively, so that no area of the stretch bar 5 comes directly into contact with the outside environment. The reference letter U designates the (non-sterile) environment of the clean room 6. The reference number 19 designates a carrier for carrying a base mould which likewise forms a component part of the blow mould. This carrier is likewise movable in the direction Y in this case.

The reference number 55 refers to a sterilization device which is preferably arranged in the interior of the clean room 6 in this case and is used for the sterilization of the individual shaping stations or respectively component parts of these shaping stations 8. This sterilization devise 55 can act in this case upon the shaping stations 8 for example with hydrogen peroxide or another sterilization agent. In this case the sterilization device 55 respectively can foe arranged in a stationary manner and the shaping stations can move with respect to this sterilization device 55. This sterilization device or stressing device 55 can be situated on the conveying wheel 2 or on the stationary wall 18 or can be arranged in a stationary manner in general and can comprise nozzles or the like. In addition, it is advantageous for sterile air for sterilizing the clean room 5 to be introduced into the clean room 6 by way of the aeration system.

The blow moulds (not shown) are arranged inside the blow mould carriers. More precisely, two blow mould carrier parts can be provided in this case which are pivotable with respect to each other and which hold a blow mould part in each case. By means of this pivoting procedure the blow moulds can be opened in order to introduce plastics material pre-forms and in order to remove completely blow moulded containers. These blow mould carriers and blow moulds are likewise arranged inside the clean room in this case.

If would also (other than shown in FIG. 2) be possible and preferred, however, for the conveying device 2 or the carrier respectively to have a C-shaped external periphery which also forms the outer walls of the clean room in part. In this way, this C-shaped clean room wall rotates in this case with the conveying device 2, i.e. the blowing wheel. In the case of this embodiment the lower boundary of the clean room is arranged at a distance from the base 13 and moves relative to the base. In this way, the clean room can be made even smaller than shown in FIG. 2. This C-shaped profile of the conveying device, which in this case forms both an inner wall and a lower and upper cover of the clean room, is preferably sealed off only with respect to the outer wall of the clean room. This outer wall is advantageously arranged in a stationary manner in this case.

In the case of a further advantageous embodiment the apparatus has a valve block (not shown) in which valves are arranged which control the supply of the compressed air to the individual shaping stations.

Figure 3:
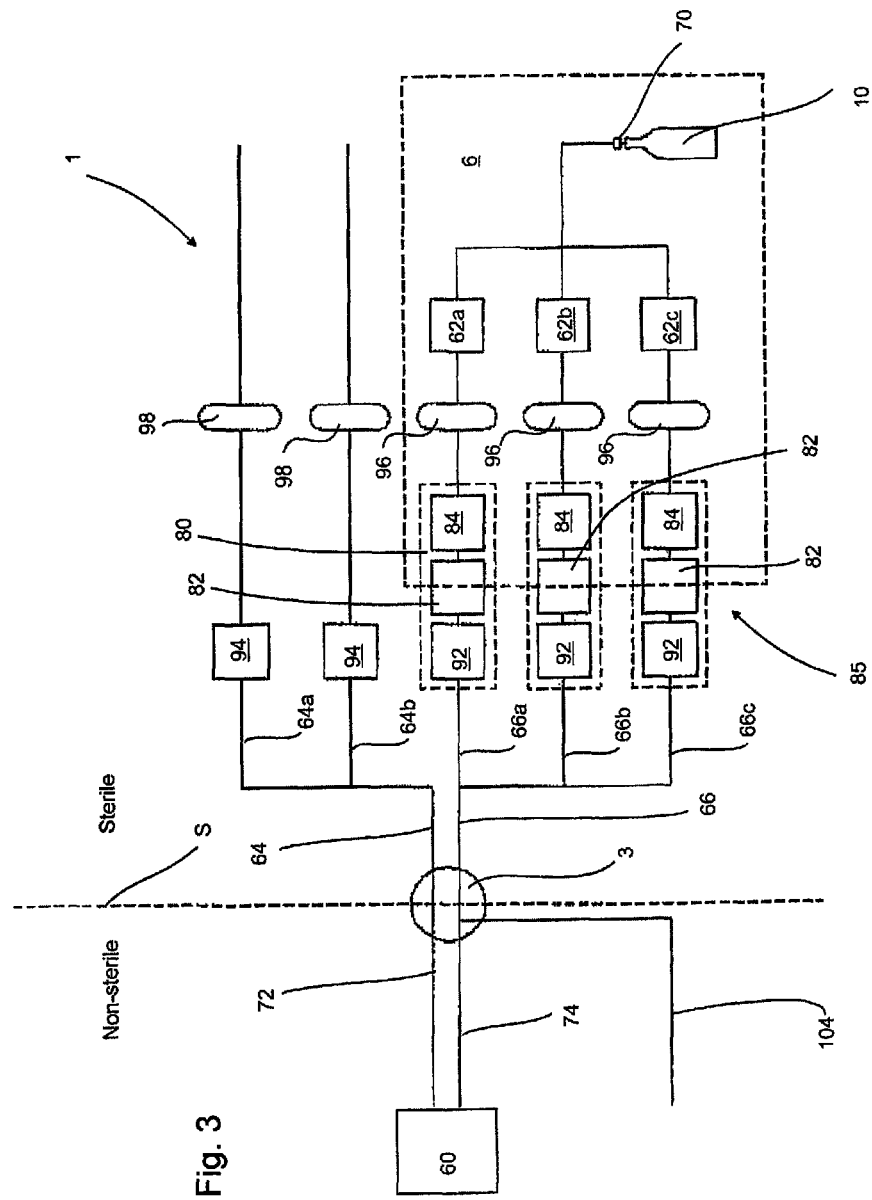
FIG. 3 is a diagrammatic illustration to indicate the flow paths for the blowing air and the control air.

FIG. 3 is an illustration in the manner of a block diagram of an apparatus according to the invention. In this case a pressure preparation device 60 is provided which can be for example a compressor arranged in a stationary manner. Two supply lines 73 and 74 start in this case from the aforesaid pressure preparation device 60. In this case the supply line 72 is used to supply valves of the machine 1 for example with control air. The supply line 74 acts as a blowing air supply means for the individual shaping stations.

The reference number 3 designates a distribution device which in this case is a rotary distributor and which is used to move the air flows from the stationary part of the machine to the movable or respectively rotating part. At the same time a sterile room boundary S, which divides the sterile region and the non-sterile region from each other, also extends in a region of this distribution device. That is to say that the elements which are arranged on the rotating part are also advantageously arranged at least in part in a clean room or respectively sterile room 6 in this case. This also applies in particular in this case to the blowing air valves 62a, 62b and 62c.

The rotary distributor has attached to it a control air line 64 and a blowing air line 66. These lines in turn branch into line portions 64a, 64b or 66a, 66b and 66c in this case. It would also be possible, however, for more or fewer branchings of this type to be provided. The reference numeral 94 refers to a pressure reduction device which in this case is arranged in the control air lines 64a and 64b in each case. This pressure reduction device is used to reduce the pressure made available by the pressure preparation device 60. The reference numbers 98 refer to channels, for example annular channels, by way of which this control air can then be distributed onto the individual shaping stations (not shown) or respectively the valves thereof.

The blowing air line 66 also branches in this case into three line portions 66a, 66b and 66c. This air, which is eventually supplied to the clean room 6, is further created by means of a module designated 85 as a whole. In this case the reference numbers 92 in turn refer to pressure reduction devices which reduce the pressure of the compressed air made available by the pressure preparation device 60, namely to the degree desired, in each case for the blow moulding procedures. In this case, in particular, different pressure levels can be set which are subsequently used for the shaping procedure of the plastics material containers, such as for example a preliminary blow moulding pressure, a finishing blow moulding pressure and the like. A filter device, which is designated 80 as a whole and which in this case has two filter units 82, 84 arranged in series, is attached to this pressure reduction device 92. It is advantageous for these filter units to be so-called HEPA filters.

The above-mentioned annular channels 96, from which supply lines (not shown) again lead to the individual shaping stations in each case, are attached to the preparation unit designated 85 as a whole.

The reference number 10 in turn designates a container which is acted upon with blowing air by a stressing device 70, such as a blow moulding nozzle 70.

The Applicants reserve the right to claim all the features disclosed in the application documents as being essential to the invention, insofar as they are novel either individually or in combination as compared with the prior art.

LIST OF REFERENCES

1 shaping device
2 conveying wheel/conveying device
3 distribution device
5 stretch bar
6 clean room
8 blow moulding stations/shaping stations
9 guide cam
10 plastics material pre-forms
11 follower device/portion
12 slide
13 base
14 further holding means
16 wall
17 cover
18 further wall
19 carrier
20 containers
22 supply device
23 holding device
24 removal device
25 sealing device
26 carrier
27 further sealing device
29 holding member
30 heating device
31 heating elements
32 sterilization device
34 conveying device
36 transfer unit
37 conveying wheel
40 filling device
42 transfer unit
44 conveying unit
50 plant
55 sterilization device/stressing device
60 pressure preparation device
62a blowing air valve
62b blowing air valve
62c blowing air valve
64 control air valve
64a line portion
64b line portion
66 blowing air line
66a line portion
66b line portion
66c line portion
70 stressing device/blow moulding nozzle
72 supply line
74 supply line/connection line
80 cleaning device/filter device
82 filter units
84 filter units
85 preparation unit/nozzle
92 pressure reduction device/pressure reducing device
94 pressure reduction device
96 annular channels/collecting line
98 channels/collecting line
104 supply line
L line
S sterile room boundary
U environment U
X axis X
Y direction

The invention claimed is:

1. An apparatus for the shaping of plastics material pre-forms into plastics material containers with a movable carrier on which are arranged a plurality of shaping stations for shaping the plastics material pre-forms into the plastics material containers, wherein each shaping station has a stressing device which acts upon the plastics material pre-forms for the expansion thereof with a gaseous medium, and with a pressure preparation device which prepares the gaseous medium, wherein the pressure preparation device is arranged in a stationary manner and supplies the shaping stations with the gaseous medium for the expansion of the plastics material pre-forms by way of at least one connection line and wherein a distribution device is provided which distributes the gaseous medium from the pressure preparation device arranged in a stationary manner to the shaping stations arranged in a movable manner, wherein the shaping stations are arranged on a circular conveyor, and each shaping station has at least one pneumatically actuated valve device which is in fluid communication with the pressure preparation device and is supplied by the latter, and wherein the apparatus has a clean room, inside which the shaping stations are arranged at least locally, wherein this clean room is bounded off from an environment by at least one wall, wherein a control air line, which supplies the valve device with a control gas, and a blowing air line, which supplies the shaping stations with the gaseous medium, are separate from each other at least downstream of the distribution device in a flow direction of the gaseous medium, and wherein the distribution device comprises a rotary distributor which is arranged at least partly outside the clean room and within a enter of the circular carrier, said center of said circular carrier being fully enclosed within said clean room in a circumferential direction.

2. The apparatus according to claim 1, wherein a first supply line is provided which supplies the control gas to the distribution device, and a second supply line is provided which supplies the blowing air to the distribution device, and the first supply line and the second supply line are separate from each other at least locally downstream of the distribution device in a flow direction of the gaseous medium.

3. The apparatus according to claim 1, wherein a cleaning device for cleaning the blowing air is provided in at least one connecting line by way of which blowing air is supplied to the shaping stations.

4. The apparatus according to claim 1, wherein the apparatus has at least one pressure reduction device which is arranged between the pressure preparation device and the shaping stations.

5. The apparatus according to claim. 4, wherein the pressure reduction device is arranged between the distribution device and the shaping stations.

6. The apparatus according to claim 4, wherein the pressure reduction device is arranged between the distribution device and the cleaning device.

7. The apparatus according to claim 1, wherein the apparatus has at least one collecting line which is connected in terms of flow at least for a time to a plurality of shaping stations.

8. The apparatus according to claim 1, wherein the apparatus has a supply line for a sterilization medium, wherein the supply line for a sterilization medium is capable of being connected in terms of flow to the blowing air line.

9. The apparatus according to claim 8, wherein the supply line for the sterilization medium opens into a supply line for supplying blowing air to the distribution device.

10. A method of shaping plastics material pre-forms into plastics material containers using the apparatus according to claim 1, wherein the plastics material pre-forms are conveyed along a pre-set conveying path by a conveying device and are shaped into the plastics material containers by being acted upon with compressed air by a plurality of shaping stations during the conveying, wherein the plastics material pre-forms are conveyed inside a clean room during the shaping and wherein blowing air for shaping the plastics material pre-forms is prepared by a pressure preparation device arranged in a stationary manner and is made available to the shaping stations by way of connection lines and a distribution device and wherein at least one valve device of the apparatus is actuated in a pneumatic manner, wherein control air for actuating the valve device and the blowing air for shaping the plastics material pre-forms are separate from each other at least downstream of the distribution device.

11. The apparatus according to claim 1, wherein those elements which are actuated by the control air are also ranged outside of the clean room so that no contaminated control air or non sterile control air can penetrate into the clean room.

12. The apparatus according to claim 1, wherein the control air line is in the form of a non-sterile region extended continuously from the compressed air source.

* * * * *